United States Patent [19]

Takahashi et al.

[11] 4,114,397
[45] Sep. 19, 1978

[54] EVAPORATOR

[75] Inventors: Reijiro Takahashi; Masanori Musoh, both of Katsuta; Tosikazu Ito, Ibaraki, all of Japan

[73] Assignee: Hitachi, Ltd., Japan

[21] Appl. No.: 743,492

[22] Filed: Nov. 19, 1976

[30] Foreign Application Priority Data

Nov. 21, 1975 [JP] Japan ................................ 50-139297

[51] Int. Cl.² .............................................. F25B 39/02
[52] U.S. Cl. ........................................ 62/516; 62/527; 165/158
[58] Field of Search ....................... 62/51 S, 516, 527; 165/158

[56] References Cited

U.S. PATENT DOCUMENTS

| 1,813,486 | 7/1931 | Eggleston | 62/515 |
| 2,704,929 | 3/1955 | Day et al. | 165/158 |
| 3,030,782 | 4/1962 | Karmazin | 62/515 |

*Primary Examiner*—Ronald C. Capossela
*Attorney, Agent, or Firm*—Craig & Antonelli

[57] ABSTRACT

An evaporator comprising a tube plate having a number of through holes to which the upper ends of a plurality of U-tubes are fixed, a first cover plate secured to the tube plate and having a plurality of through holes aligned to some through holes of the tube plate, a second cover plate secured to the first cover plate and defining in cooperation therewith passages for introducing and distributing refrigerant, and an expansion valve assembly installed through the first and second cover plates and having a constriction formed therein. The first cover plate defines connecting passages and a collecting passage for the refrigerant in cooperation with the tube plate. The constriction in the expansion valve assembly is communicated with the refrigerant-introducing passage, and the control section of the expansion valve assembly is communicated with the refrigerant-collecting passage, so that the refrigerant flows through a high-pressure piping into the refrigerant-introducing passage and the vaporized refrigerant passes through the refrigerant-collecting passage and leaves the evaporator into a low-pressure piping.

12 Claims, 13 Drawing Figures

EVAPORATOR

BACKGROUND OF THE INVENTION

This invention relates to evaporators for automotive air conditioners, and, more specifically, to evaporators with a built-in expansion valve for such uses.

In conventional air conditioners, an expansion valve is installed midway in the piping leading to the evaporator, or away therefrom, so that the expansion valve and the evaporator occupy a relatively large proportion of the limited vehicle space. The expansion valve thus supported by the piping is directly subjected to jolts during the running of the automobile and tends to become unstable in control. Also, force produced by the evaporator's own weight acts on the connections between the piping and the expansion valve and between the piping and the evaporator, which may cause cracks of the piping and leakage of the refrigerant.

Since air conditioners for use with automobiles are used under rigorous thermal load conditions, the flow rate of refrigerant through the system must be larger than that in household air conditioners and refrigerators. For this reason evaporators for automobile air conditioners usually are comprised of several sets of cooling units arranged in parallel, and refrigerant is distributed to the cooling units through several branched pipes from a header connected to the end of piping on the discharge side of the expansion valve.

Consequently, piping associated with the evaporator is so complex that the efficiency of piping work during assembly is reduced and productivity is limited owing to the presence of many connections. In addition, a large number of connections results in a high probability of refrigerant leakage and low reliability of evaporator performance.

SUMMARY OF THE INVENTION

It is an object of the present invention to provide an evaporator in which piping is simplified and a number of connections is reduced to improve the efficiency of piping work during assembly and to enhance the reliability of evaporator performance and, further, to decrease the overall volume of the evaporator and associated parts including an expansion valve.

It is a feature of this invention that at least one cover plate is secured to an upper tube plate of the evaporator to form passages between the cover plate and the upper tube plate for introducing and distributing refrigerant to sets of evaporating units, a constriction is formed midway in the refrigerant-introducing passage, a valve body is adapted to seat against the constriction, and control means for controlling the valve body to adjust the cross sectional area of the constriction is provided.

Another feature of the invention resides in the provision of a valve section in which the aforesaid constriction and valve body are integrally incorporated and which is installed in the said refrigerant-introducing passage, and means for establishing an airtight seal between the cover plate or plates and the valve section.

DESCRIPTION OF THE PREFERRED EMBODIMENTS

Figure 1:
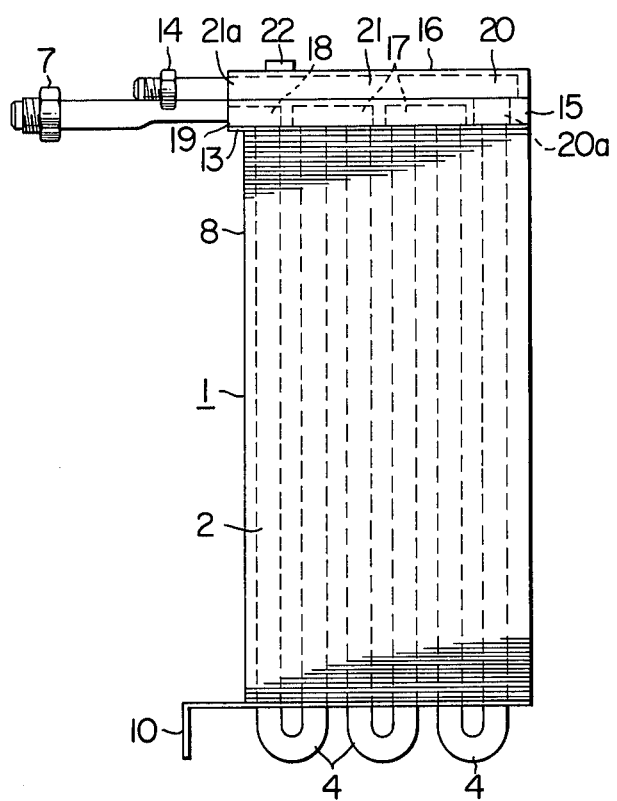
FIG. 1 is an elevational view of one embodiment of the evaporator of the present invention.

In FIG. 1 is shown one embodiment of the evaporator according to the present invention. The evaporator indicated generally by the numeral 1 consists of a number of plate fins 8 arranged in parallel at suitable vertical intervals, five sets of evaporating units 2 extending vertically through the plate fins, upper and lower tube plates 13, 10 securely supporting the plate fins and the evaporating units at both upper and lower ends thereof, a lower cover plate 15 integrally attached to the upper tube plate 13, an upper cover plate 16 integrally attached to the lower cover plate 15, and an expansion valve assembly 22 fixed to the upper and lower cover plates.

Figure 3:
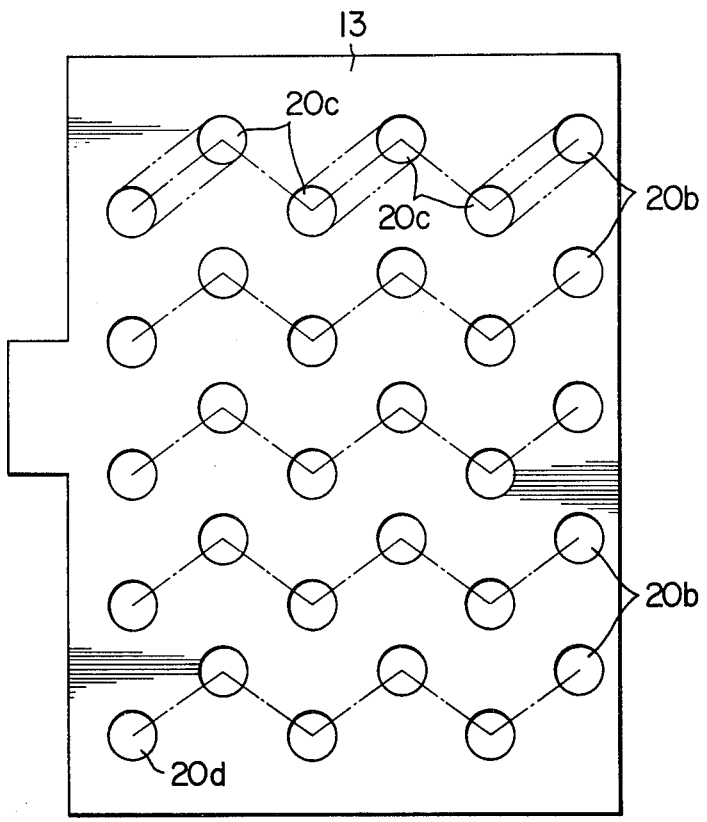
FIG. 3 is a plan view of the upper tube plate.

Referring to FIG. 3, the upper tube plate 13 is formed with holes 20b, 20c, 20d into which U-tubes 4 of the evaporating units are fitted. Similarly, the lower tube plate 10 and plate fins 8 are formed with holes which are aligned with those of the upper plate in assembled condition. Each evaporating unit 2 is shown as comprising three U-tubes 4 which extend through corresponding holes formed, as indicated by two-dot chain lines in FIG. 3, in the upper and lower tube plates 13, 10 and fins. Each plate fin has collars (not shown) of a predetermined length formed around the holes through which the U-tubes extend, so that the respective plate fins are kept a predetermined distance apart from the adjacent plate fins.

In assembling the evaporator, fifteen U-tubes 4 of the sets of evaporating units are inserted through the corresponding holes of the lower tube plate 10 and thence through the holes of the plate fins 8 arranged one upon another in properly spaced relations. Lastly, the upper ends of the U-tubes 4 are fitted in the holes of the upper tube plate 13 and secured thereto by brazing or the like. Thus, the plate 13 and tube opening ends are solidly connected and sealed flush with one another.

Figure 5:
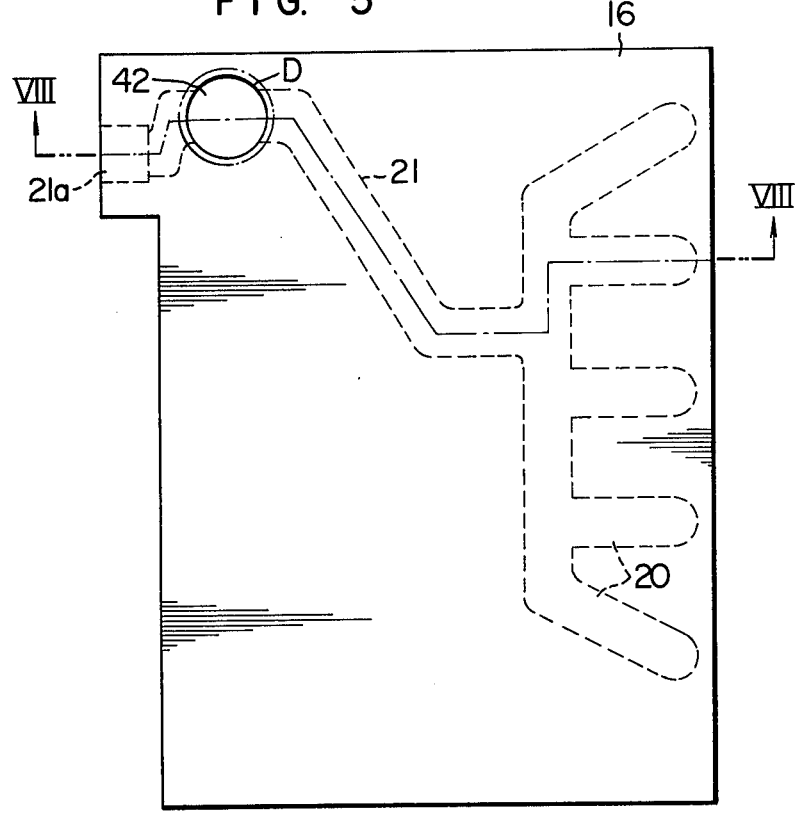
FIG. 5 is a top plan view of the upper cover plate.
Figure 6:
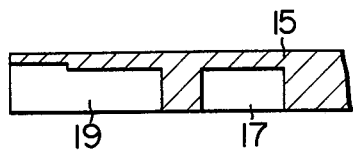
FIG. 6 is a fragmentary sectional view of the lower cover plate taken along line VI—VI' of FIG. 4.
Figure 8:
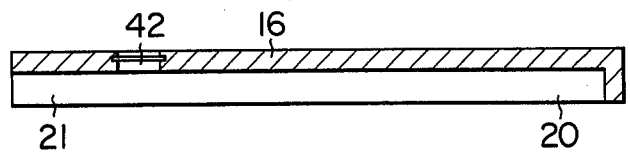
FIG. 8 is a sectional view of the upper cover plate taken along line VIII—VIII of FIG. 5.

The upper cover plate 16, as best shown in FIGS. 5 and 8, includes a refrigerant-introducing passage 21, an inlet opening 21a for a high-pressure line, and distribution passages 20. The refrigerant-introducing passage 21 is branched midway into five distribution passages 20 which are respectively communicated with the inlet tube ends of five sets of the evaporating units via holes 20a formed in the lower cover plate 15.

To the inlet opening or connection 21a of the refrigerant-introducing passage 21 is connected a high-pressure piping 14 by brazing or the like. (FIG. 2) The passage 21 defining a recess on the underside of the upper cover plate 16 and a refrigerant-collecting passage 18 also formed in the lower cover plate 15 (to be described hereinbelow in more detail) are vertically communicated at least in an area D (in FIGS. 2, 4 and 5). Coaxially with a through hole 41 formed in the area D of the lower cover plate 15 as shown in FIG. 4, a through hole 42 is formed in the area D of the upper cover plate 16 as shown in FIGS. 5 and 8.

Figure 2:
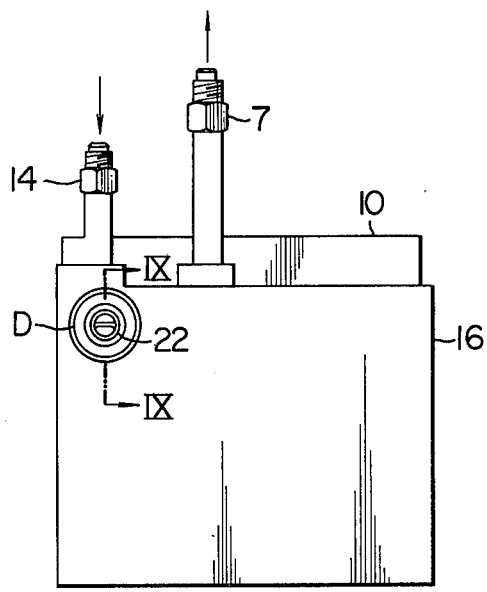
FIG. 2 is a top plan view of the evaporator shown in FIG. 1.
Figure 4:
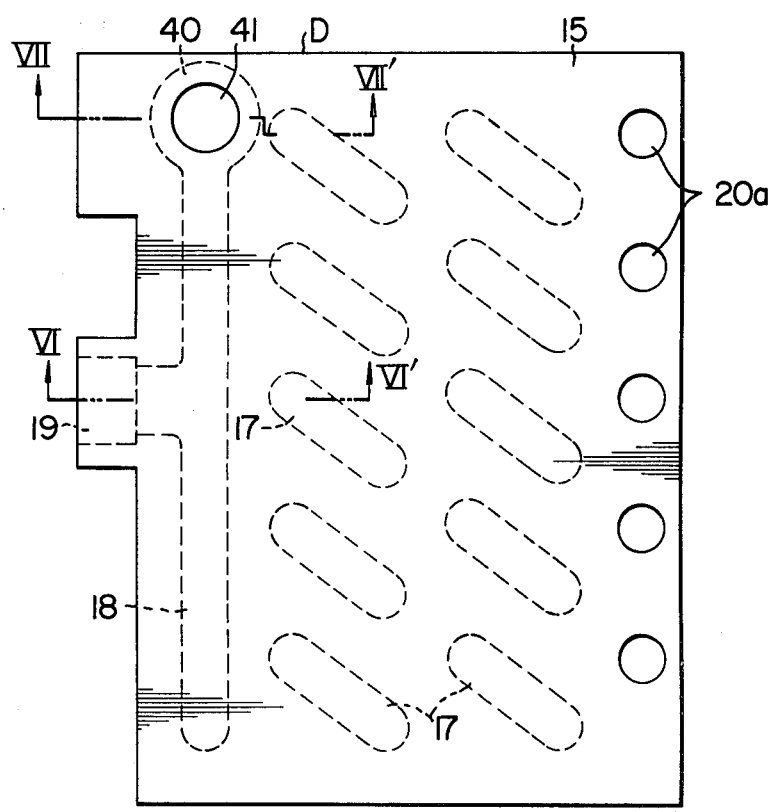
FIG. 4 is a top plan view of the lower cover plate.
Figure 7:
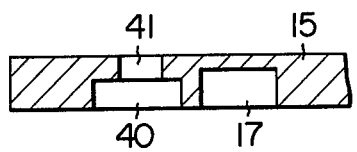
FIG. 7 is a fragmentary sectional view of the lower cover plate taken along line VII—VII' of FIG. 4.

As will be seen from FIG. 4, the lower cover plate 15 includes in addition to the refrigerant-collecting passage 18 a discharge opening 19 and connecting passages 17 for the evaporating units 2, which passages are formed on the underside of the lower cover plate 15, and through holes 20a are formed in the lower cover plate and are adapted to be aligned with the holes 20b of the upper tube plate 13. In the area D of the lower cover plate 15, as shown in FIGS. 4 and 7, there are formed an annular recess 40 communicated with the refrigerant-collecting passage 18 and a through hole 41 of a smaller diameter than that of the annular recess 40. To the refrigerant discharge opening 19 is connected a low-pressure piping 7 as by brazing. (FIG. 2)

The upper cover plate 16 is attached to the lower cover plate 15, and the lower cover plate to the upper tube plate 13 by brazing or otherwise. This places the refrigerant-collecting passage 18 formed on the underside of the lower cover plate 15 in communication with the refrigerant-discharging ends of five sets of evaporating units 2. The connecting passages 17 which total ten in number on the underside of the lower cover plate 15, as shown in FIG. 4, are independent of one another, and connect the open ends of the U-tubes 4 above the tube plate 13 to provide continuous evaporating units 2.

Figure 9:
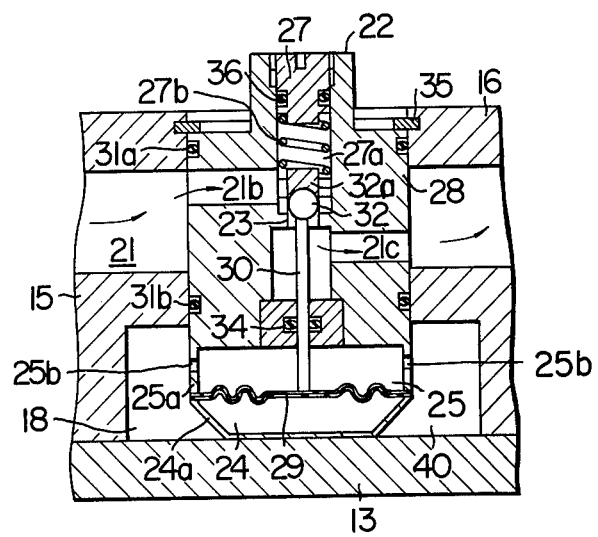
FIG. 9 is a vertical sectional view of the expansion valve as installed in the evaporator shown in FIG. 1 and taken along line IX—IX' of FIG. 2.

Referring now to FIG. 9, an expansion valve 22 is shown as being inserted into the through hole 42 of the upper cover plate 16 and the through hole 41 of the lower cover plate 15, and is secured in place by a snap ring 35. The expansion valve body 28 includes seal rings 31a, 31b which are received in circular grooves formed thereon to seal the valve body against the upper and lower cover plates 16, 15.

The expansion valve body 28 built as a unitary block comprises a valve section, a control section and a regulating section. The valve section is disposed in the refrigerant-introducing passage 21 of the upper cover body 16 with the control section in the annular recess 40 being in communication with the refrigerant-collecting passage 18 of the lower cover plate 15, and with the regulating section above the valve section.

The valve section includes holes 21b, 21c open to the refrigerant-introducing passage 21, a constriction 23 formed between the two holes, and a ball valve 32 adapted to be seated on the constriction 23.

The ball valve 32 is fixedly connected to one end of a valve rod 30 which extends toward the control section and the valve rod 30 bears at the opposite end thereof against the center portion of a diaphragm 29 provided in the control section. The diaphragm 29 is held at the periphery thereof between a circular skirt 25a forming a lower extension of the valve body 28 and a truncated-cone-shaped bottom cover 24a. Thus, an equalizing chamber 25 is defined between the valve body 28 and the diaphragm 29, and a heat-sensitive chamber 24 between the bottom cover 24a and the diaphragm 29. The equalizing chamber 25 is communicated with the annular recess 40 of the lower cover plate 15 through apertures, 25b formed in the skirt 25a, while the heat-sensitive chamber 24 is hermetically sealed and filled with the same gas as the refrigerant. The gas may be replaced by some other gases which are corrosion resistant and sensitive to temperature changes with a high coefficient of cubical expansion.

The regulating section comprises a hole 27a formed in the valve body 28 and communicated with the constriction 23 and the hole 21b, a valve guard 32a disposed in the hole 27a and engaged with the ball valve 32, an adjusting spring 27b biasing the valve guard 32a downward, and an adjusting screw 27 for adjusting the compressive force of the adjusting spring 27b. The adjusting screw 27 is screwed into an internally threaded hole formed in the valve body 28. A seal ring 36 received in a circumferential groove of the screw stem establishes an airtight seal between the screw 27 and the hole 27a of the valve body 28. The compressive force of the adjusting spring 27b cooperates with the pressure-receiving capacity of the diaphragm 29 to allow the ball valve 32 to be normally seated on the constriction 23 when the operation of the apparatus is to be stopped, thus shutting off the passing of the refrigerant from the hole 21b to the hole 21c.

The operation of the apparatus, illustrated in FIGS. 1 through 9, according to the invention will be described below.

Refrigerant from the high-pressure piping 14 enters the valve section of the expansion valve 22 through the refrigerant-introducing passage 21 formed in the upper cover plate 16. As it passes through the holes 21b, constriction 23, and hole 21c, the refrigerant is adiabatically expanded and is introduced into the evaporating units 2 by way of the distribution passages 20 of the upper cover plate 16 and the through holes 20a of the lower cover plate 15. The refrigerant introduced into the cooling tubes of the evaporating units flows zigzag through the tubes and the connecting passages 17 formed in the lower cover plate 15 to arrive at the collecting passage 18 of the lower cover plate 15.

From the collecting passage 18 the refrigerant is conducted to the annular recess 40 of the lower cover plate 15, and thence to the control section of the expansion valve 22. After evaporation the refrigerant is led to the recess 40 and through the holes, 25b into the equalizing chamber 25, where it acts on one side of the diaphragm 29. The gas contained in the heat-sensitive chamber 24 then expands or contracts according to the temperature of the refrigerant in the equalizing chamber and the gas pressure in the heat-sensitive chamber 24 accordingly acts on the other side of the diaphragm 29. Thus, the diaphragm 29 is displaced due to the pressure difference between the equalizing chamber 25 and the heat-sensitive chamber 24 to move the valve rod 30 to thereby control the ball valve 32.

Turning of the adjusting screw 27 will change the biasing force of the adjusting spring 27b against the ball valve 32 and therefore the working characteristic of the diaphragm 29, too, so that the cooling capacity of the apparatus can be adjusted to suit varying operating conditions.

Figure 10:
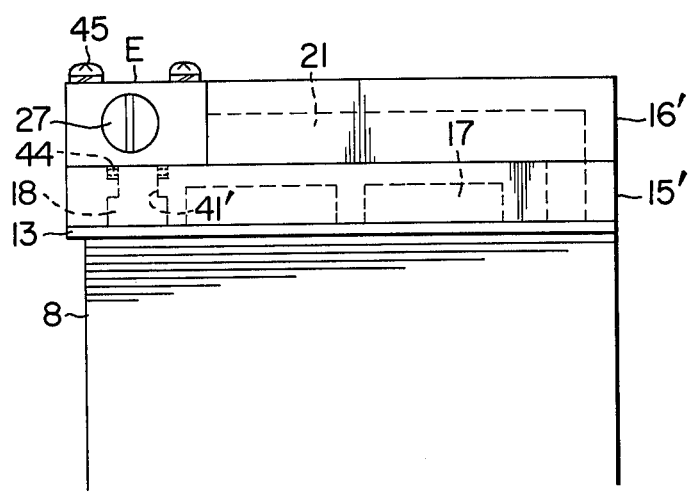
FIG. 10 is a partly sectional elevational view of another embodiment of the evaporator of the invention with the axis of the expansion valve being horizontal.
Figure 11:
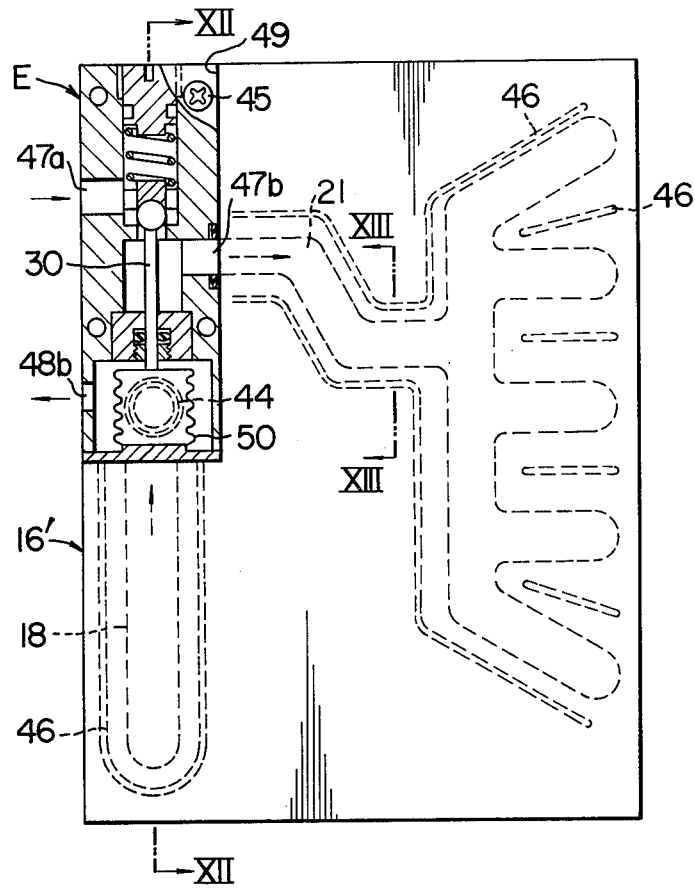
FIG. 11 is a top plan view of the evaporator of FIG. 10 with the expansion valve shown in section.
Figure 12:
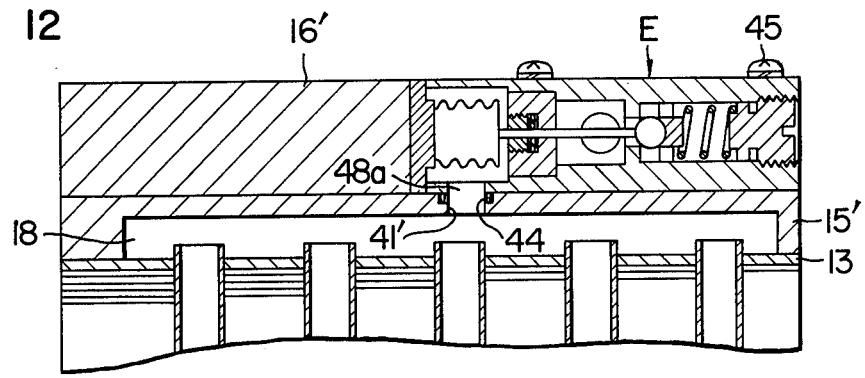
FIG. 12 is a partly sectional view taken along line XII—XII of FIG. 11.

FIGS. 10 to 13 illustrate another embodiment of the evaporator of the invention. This evaporator is of the same construction as the first embodiment shown in FIGS. 1 through 9 except that the expansion valve assembly E lies horizontally on the upper and lower cover plates 16', 15'. In addition, the lower cover plate 15' is rectangular-shaped with no projection or extension, and the annular recess 40, through hole 41, and refrigerant-discharge opening 19 of the first embodiment are replaced by a through hole 41'. Otherwise the lower cover plate 15' has the same construction as the counterpart 15 shown in FIG. 4. The hole 41', as shown in FIGS. 10 and 12, extends from the refrigerant-collecting passage 18 upward through the lower cover plate 15'. The upper cover plate 16' is fabricated in the same way as the plate 16 in FIG. 5 with the exception that a cutaway part 49 is formed in place of the through hole 42 and inlet end or connection 21a of the first embodiment. The cutaway part 49 is large enough to accommodate the rectangular expansion valve assembly E, and the passage 21 open to the cutaway part is communicated with a hole 47b of the expansion valve.

As shown in FIGS. 10, 11 and 12, the expansion valve assembly E is secured to the lower cover plate 15' by means of four setscrews 45. The valve is substantially the same in construction as the expansion valve shown in FIG. 9 except that a bellows 50 is provided in lieu of the diaphragm 29, and heat-sensitive chamber 24 of the first embodiment and that holes 47a, 47b, 48a, 48b are formed instead of the holes 21b, 21c, 25b.

Referring specifically to FIG. 12, the hole 48a is communicated with the hole 41' of the lower cover plate 15', and an O-ring 44 fitted in a groove formed around the hole 41' of the lower cover plate provides a seal against leakage of the refrigerant from between the holes 48a and 41'. A high-pressure piping 14 is connected to the hole 47a, and a low-pressure piping 7 to the hole 48b. In the same manner as with the expansion valve of FIG. 9, the valve rod 30 bears against the bellows 50. Like the heat-sensitive chamber 24 of FIG. 9, the bellows 50 airtightly contains the refrigerant or other suitable gas.

Figure 13:
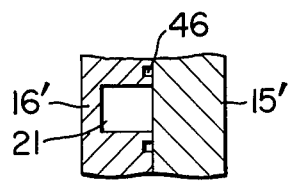
FIG. 13 is a fragmentary sectional view taken along line XIII—XIII of FIG. 11.

FIGS. 11 and 13 show the upper cover plate 16' formed with narrow grooves 46 on the underside thereof to be filled with silver alloy by brazing. The lower cover plate 15' also has similar narrow grooves (not shown). It will be appreciated that the upper and lower cover plates in the first embodiment shown in FIGS. 1 through 9 is equally formed with such narrow grooves for silver alloy brazing.

The operation of the apparatus embodied in FIGS. 10 to 13 is similar to that of the first embodiment in FIGS. 1 through 9, and therefore the explanation is omitted.

While the evaporators according to the embodiments of the invention so far described employ an expansion valve assembly in which the valve section and control section are combined in a unitary construction, it is possible, as an alternative, to separate the control mechanism from the valve section so that its pressure- and temperature-sensing elements consists, respectively, of an equalizing pipe and a heat-sensitive cylinder as in the prior art. In such case, the control section must be disposed outside of the cover plate to establish communication with the equalizing pipe and heat-sensitive cylinder in place of the refrigerant-collecting passage. Even so, the expansion valve including the valve section is built in or directly connected to the refrigerant-introducing passage and remains as effective as in the original arrangement in offering the advantages of the invention.

In accordance with the present invention, the upper and lower cover plates are attached to the upper tube plate of the evaporator with passages formed therebetween for introducing, distributing, and collecting the refrigerant and for connecting the U-tubes, and the expansion valve is installed in those passages. This construction simplifies piping and provides extreme ease of pipe connection work because all pipes and tubes can be connected at two planes between the lower cover plate and tube plate and between the upper and lower cover plates.

Although the upper and lower cover plates are placed over the upper tube plate in the embodiments described above, it is possible to attach a single cover plate to the tube plate provided the cover plate is fabricated by press work to proper configurations formed with all the passages for refrigerant introduction, distribution, collection, and discharge plus the passages for U-tube connection.

According to the invention, as described hereinbefore, the evaporator is compact in construction because the piping is simplified and the number of connections is decreased. Consequently, the reliability is improved and the productivity of assembling work is increased.

While the invention has been described with reference to preferred embodiments thereof, it will be understood that various changes and modifications may be made in the invention without departing from the spirit and scope thereof as set forth in the accompanying claims.

What is claimed is:
1. An evaporator comprising:
a tube plate,
a first cover plate secured to said tube plate to form connecting passage means and refrigerant-collecting passage means between said tube plate and said first cover plate,
a second cover plate secured to said first cover plate to form refrigerant-introducing passage means between said first cover plate and said second cover plate,
constriction means communicated with said refrigerant-introducing passage means,
expansion valve means disposed between said first cover plate and said second cover plate and directly communicated with said refrigerant-collecting passage means and said refrigerant-introducing passage means,
and control means for controlling said expansion valve means.

2. The evaporator of claim 1 wherein said constriction means and said expansion valve means are integrally combined to form a valve mechanism section.

3. The evaporator of claim 2 further comprising a high-pressure piping and a low-pressure piping.

4. The evaporator of claim 2 wherein said connecting passage means and said refrigerant-collecting passage means are communicated with U-tubes.

5. The evaporator of claim 2 wherein said valve mechanism section and said first and second cover plates have seal means respectively therebetween.

6. The evaporator of claim 1 wherein said second cover plate is formed with both outlet and inlet openings for the refrigerant.

7. The evaporator of claim 6 wherein said connecting passage means and said refrigerant-collecting passage means are communicated with U-tubes.

8. The evaporator of claim 6 further comprising a high-pressure piping and a low-pressure piping, said high-pressure piping being connected to said inlet opening and said low-pressure piping to said outlet opening.

9. The evaporator of claim 1 wherein said connecting passage means and said refrigerant-collecting passage means are communicated with U-tubes.

10. The evaporator of claim 1 further comprising a high-pressure piping and a low-pressure piping.

11. The evaporator of claim 1 wherein said second cover plate is formed with an inlet opening for the refrigerant and said first cover plate is formed with an outlet opening for the refrigerant.

12. The evaporator of claim 1 wherein said second cover plate is formed with both inlet and outlet openings for the refrigerant.

* * * * *